March 20, 1951     J. M. BARBER     2,545,440
HAND TRUCK

Filed Feb. 10, 1948     2 Sheets-Sheet 1

INVENTOR.
JOHN M. BARBER,
BY McMorrow, Berman & Davidson
ATTORNEYS.

March 20, 1951  J. M. BARBER  2,545,440
HAND TRUCK

Filed Feb. 10, 1948  2 Sheets-Sheet 2

INVENTOR.
JOHN M. BARBER,
BY
McMorrow, Berman & Davidson
ATTORNEYS.

Patented Mar. 20, 1951

2,545,440

UNITED STATES PATENT OFFICE 2,545,440

HAND TRUCK

John M. Barber, Clear Lake, Iowa

Application February 10, 1948, Serial No. 7,390

4 Claims. (Cl. 214—95)

This invention relates generally to improvements in hand trucks involving means movable relative to the frame or body thereof for raising and lowering a load carried by the hand truck, and more particularly to an improved hand truck designed especially, but not exclusively, for transporting and handling heavy vehicle wheels and tires and having hydraulically-operated means movable relative to the frame or body of the hand truck, for raising and lowering the wheels and/or tires to aid in removing and replacing them on the axles or wheel hubs of the vehicle and in transporting such objects and others from place to place in a garage or other premises, the primary object of the invention being to provide an easily-maneuvered hand truck of the character indicated which has a large capacity, which enables quick and easy handling of heavy objects, such as truck wheel assemblies and tires, by one man.

Another important object of the invention is the provision of a device of the above indicated character which is simple and inexpensive in construction yet rugged and serviceable, and presents no special manufacturing problems.

A further important object of the invention is to provide a device of the above indicated character which occupies a minimum of floor space when in use and occupies a minimum of storage and shipping space.

Other important objects and advantageous features of the invention will be apparent from the following description and the drawings thereunto appended, wherein for present purposes of illustration only, a specific embodiment of the invention is set forth in detail.

Figures 1, 2, 3:
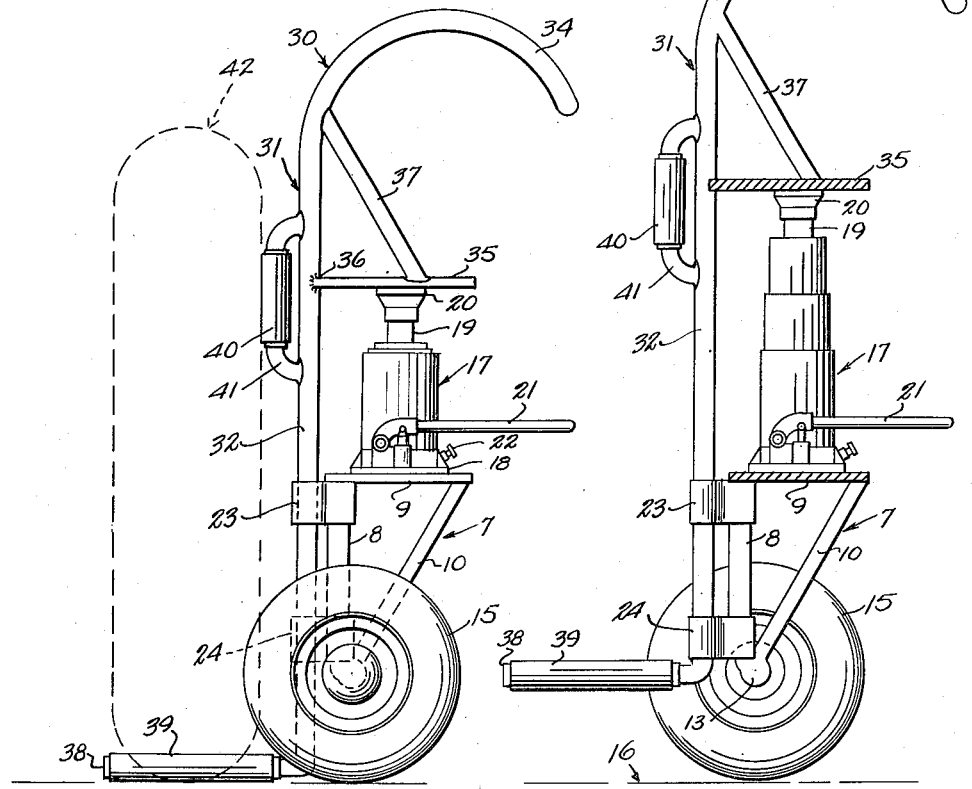
Figure 1 is a left-hand side elevation of the hand truck adjusted to depressed position, a heavy vehicle tire being shown loaded thereon in dotted lines.
Figure 2 is a similar view showing the hand truck adjusted to elevated position.
Figure 3 is a top plan view.

Referring in detail to the drawings, the illustrated hand truck comprises a wheeled frame 7 comprising two vertical front tubes 8, 8 fixed to depend from the underside of the ends of the forward edge portion of a horizontal laterally-elongated stiff plate 9, from the underside of whose rear edge portion depend two forwardly-declining diagonal braces 10, 10, preferably welded as indicated at 11 to the plate 9 and at their lower ends at 12 to the rearwardly-deflected lower end portions 13 of the front tubes 8, 8, the braces 10, 10 being in the same vertical plane as the front tubes 8, 8.

The deflected lower end portions 13 of the front tubes 8, 8 mount laterally outwardly-directed sub axles 14, 14 on which preferably pneumatic tired wheels 15, 15 are journaled to support the frame 7 upon the ground 16.

A hydraulic lift or jack 17 has its base 18 fixedly mounted upon the middle of the plate 9, with its vertically-movable piston 19 projecting upwardly and terminating in a head 20. The jack has a conventional operating handle lever 21 projecting rearwardly therefrom, and suitable manual valve mechanism 22 operable to condition rise of the head 20 when the handle 21 is operated, and adjustable to permit the head 20 to subside from an elevated position.

Figure 5:
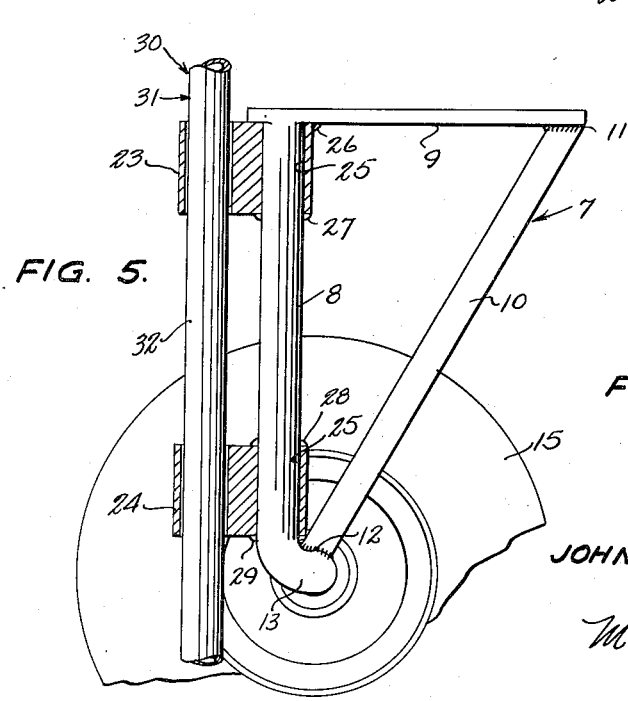
Figure 5 is an enlarged fragmentary vertical section showing details of construction.
Figure 6:
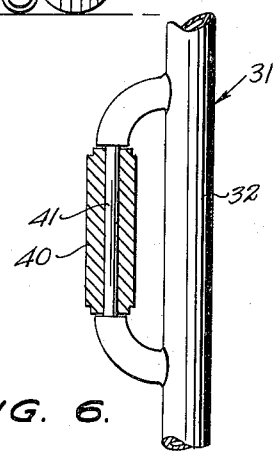
Figure 6 is a similarly enlarged fragmentary vertical section showing further details of construction.

Vertical tubular upper and lower slide bearings 23 and 24, respectively, project forwardly from the upper and lower extremities of the tubes 8, 8, and have bores 25, 25 receiving the tubes 8, 8. As shown in Figure 5, the upper bearings are welded at 26 to the plate 9 and at 27 to the related tubes 8, and the lower bearings 24 are welded at top and bottom, at 28 and 29, to the related tubes 8, 8.

The vertically-adjustable load-carrying frame 30 which is carried by the wheeled frame 7 comprises vertically tubular side members 31, 31 each of which comprises a straight portion 32 of sufficient length to reach from the ground 16 to a point well-above the jack 17, which are slidably confined in the slide bearings 23 and 24. Each side member 31 terminates at its upper end in a rearwardly and downwardly curved handle 34. A horizontal transversely-elongated rectangular stiff plate 35, similar to the plate 9 has the lateral extremities of its forward edge welded, as indicated at 36, to and between the straight portions 32 of the side members 31, 31, and diagonal rearwardly-declining braces 37, 37 are secured at their upper ends to the upper part of the said straight portions and at their lower ends to rearward portions of the plate 35. The plate 35 overlies and is secured to the jack piston head 20.

Figure 4:
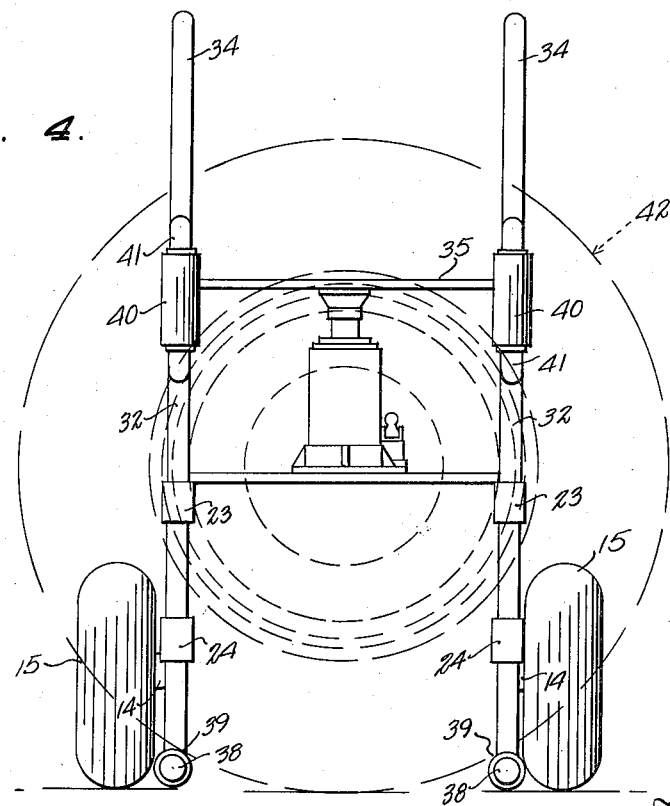
Figure 4 is a front elevation.

The lower ends of the side members 31, 31 terminate in forwardly-directed right-angular feet 38, 38 which may have sleeve rollers 39, 39 circumposed thereon to facilitate placement of vehicle wheel assemblies or tires thereon or other objects to be lifted and transported over the ground 16. As shown in Figures 1 and 4, the feet 38, 38 can rest upon the ground 16 in the depressed position of the adjustable frame 30 and, therefore, can operate from ground level in lifting objects therefrom.

At about the level of the upper plate 35, the forward sides of the side members 31 are provided with roller rests 40, 40 which project forwardly and are supported on vertical axes by axle elements 41, 41 which are secured to the side members at points above and below the plate 35, and against which the tire 42 or other load is to rest, as indicated in Figure 1.

In operation, in the case of utilizing the improved hand truck to lift and handle a vehicle tire 42, indicated in dotted lines in Figure 1, the hand truck is, with the adjustable frame 30 in its elevated position as illustrated in Figure 2, is wheeled over the ground on the wheels 15, with the operator holding the handles 34, 34 with the truck in a rearwardly canted position, in the ordinary manner of wheeling a hand truck, to a position alongside of the upright tire 42, which may be on the vehicle axle or resting upon the ground 16.

The hydraulic jack valve 22 is then operated to permit the frame 30 to subside until the feet 38, 38 reach ground level, whereupon the truck is pushed to place the feet under opposite sides of the tire 42, as indicated in dotted lines in Figure 4.

The hydraulic jack handle 21 is then operated to extend the jack piston 19 upwardly and thereby elevate the frame 30 to the desired elevation above the ground 16. The truck with the load thereon, in this instance the tire 42, can then be wheeled over the ground 16 to transport the load away from, and subsequently back to, the pick-up point, as desired.

It will be observed that the arrangement of the component parts of the above described hand truck is such that the same is usefully overbalanced in a rearward direction by the positioning and weight of the hydraulic jack 17, and the plates 9 and 35, and the handles 34, 34 so that the weight of the load on the feet 38, 38 is somewhat counterbalanced, and the truck as a whole is rendered easily maneuverable.

What is claimed is:

1. A hand truck comprising a relatively stationary wheeled frame having depending ground engaging wheels on opposite sides thereof, said frame having forwardly positioned laterally spaced vertical side members each having forwardly projecting vertically spaced side bearings thereon, said frame terminating at its upper end in a platform positioned rearwardly from said vertical members, a vertically movable frame comprising laterally spaced vertical side members slidably confined in said vertically spaced slide bearings on the side members of said stationary frame, the side members of said vertically adjustable frame being vertically elongated to extend from a point below said stationary frame to a point substantially above said platform of said stationary frame, the lower ends of the side members of said adjustable frame having forwardly projecting load bearing arms arranged to rest upon the ground in front of said adjustable frame while said adjustable frame is in a depressed position whereby forward tilting of the truck on the axis of the ground engaging wheels is precluded, an abutment on an upper part of said adjustable frame connected to and between the side members of said adjustable frame and projecting rearwardly therefrom to a position spaced vertically over said platform on the upper end of said stationary frame, and a vertically extensible and contractible jack operatively interposed between and engaging said platform and said abutment and spaced rearwardly from said adjustable frame for raising and lowering said vertically adjustable frame relative to said stationary frame from a depressed position in which said load bearing arms engage the ground to an elevated position in which said load bearing arms are elevated above the ground.

2. A hand truck comprising a relatively stationary wheeled frame having depending ground engaging wheels on opposite sides thereof, said frame having forwardly positioned laterally spaced vertical side members each having forwardly projecting vertically spaced slide bearings thereon, said frame terminating at its upper end in a platform positioned rearwardly from said vertical members, a vertically movable frame comprising laterally spaced vertical side members slidably confined in said vertically spaced slide bearings on the side members of said stationary frame, the side members of said vertically adjustable frame being vertically elongated to extend from a point below said stationary frame to a point substantially above said platform of said stationary frame, the lower ends of the side members of said adjustable frame having forwardly projecting load bearing arms arranged to rest upon the ground in front of said adjustable frame while said adjustable frame is in a depressed position whereby forward tilting of the truck on the axis of the ground engaging wheels is precluded, an abutment on an upper part of said adjustable frame connected to and between the side members of said adjustable frame and projecting rearwardly therefrom to a position spaced vertically over said platform on the upper end of said stationary frame, and a vertically extensible and contractible jack operatively interposed between and engaging said platform and said abutment and spaced rearwardly from said adjustable frame for raising and lowering said vertically adjustable frame relative to said stationary frame from a depressed position in which said load bearing arms engage the ground to an elevated position in which said load bearing arms are elevated above the ground, forwardly projecting load engaging elements on the upper part of the vertical side members of said adjustable frame.

3. A hand truck comprising a relatively stationary wheeled frame having depending ground engaging wheels on opposite sides thereof, said frame having forwardly positioned laterally spaced vertical side members each having forwardly projecting vertically spaced slide bearings thereon, said frame terminating at its upper end in a platform positioned rearwardly from said vertical members, a vertically movable frame comprising laterally spaced vertical side members slidably confined in said vertically spaced slide bearings on the side members of said stationary frame, the side members of said vertically adjustable frame being vertically elongated to extend from a point below said stationary frame to a point substantially above said platform of said stationary frame, the lower ends of the side members of said adjustable frame having forwardly projecting load bearing arms arranged to rest upon the ground in front of said adjustable frame while said adjustable frame is in a depressed position whereby forward tilting of the truck on the axis of the ground engaging wheels is precluded, an abutment on an upper part of said adjustable frame connected to and between the side members of said adjustable frame and projecting rearwardly therefrom to a position spaced vertically over said platform on the upper end of said stationary frame, and a vertically extensible and contractible jack operatively interposed between and engaging said platform and said abutment and spaced rearwardly from said adjustable frame for raising and lowering said vertically adjustable frame relative to said stationary frame from a depressed position in which said load bearing arms engage the ground to an elevated position in which said load bearing arms are elevated above the ground, forwardly projecting load engaging elements on the upper part of the vertical side members of said adjustable frame, and rearwardly extending handles on the upper ends of the said vertical side members of the adjustable frame enabling rearwardly tilting the truck on the axes of said ground engaging wheels in a manner to cause a load on said load bearing arms to gravitate into engagement with said load engaging elements and permit trundling the truck over the ground to transport the load by holding said handles.

4. A hand truck comprising a vertically elongated and vertically adjustable load carrying frame, said frame terminating at its lower end in a forwardly projecting load carrying arm adapted to rest upon the ground during the imposition of a load thereon, said frame terminating at its upper end in a rearwardly projecting handle, a relatively stationary frame having ground engaging wheels supporting the truck for rolling upon the ground while the handle is held in a rearwardly tilted position, said stationary frame being limited in height to a fraction of the height of said adjustable frame, forwardly projecting bearing means on said stationary frame mounting said adjustable frame on said stationary frame for vertical movement relative thereto, a fixed abutment on said adjustable frame spaced above the upper end of said stationary frame and projecting rearwardly therefrom and over said stationary frame, and a vertically extensible and contractible jack operatively interposed between abutment and the upper end of said stationary frame for raising and lowering said adjustable frame relative to said stationary frame.

JOHN M. BARBER.

REFERENCES CITED

The following references are of record in the file of this patent:

UNITED STATES PATENTS

| Number | Name | Date |
| --- | --- | --- |
| 1,640,297 | Rogers | Aug. 23, 1927 |
| 1,964,119 | Hendry | June 26, 1934 |
| 2,217,898 | Gemmill | Oct. 15, 1940 |
| 2,400,312 | Miller | May 14, 1946 |
| 2,415,655 | Reinert | Feb. 11, 1947 |
| 2,431,096 | Van Den Bergh et al. | Nov. 18, 1947 |
| 2,447,435 | Settle | Aug. 17, 1948 |
| 2,455,432 | Martin | Dec. 7, 1948 |